JOHN TORRENT.
Log Rolling Machine.

No. 120,220.  
Patented Oct. 24, 1871.

Witnesses.  
Jas. A. Lowndes  
H. A. Daniels

John Torrent Inventor.  
Chas. S. Whitman Att'y

UNITED STATES PATENT OFFICE.

JOHN TORRENT, OF MUSKEGON, MICHIGAN.

IMPROVEMENT IN LOG-ROLLING MACHINES.

Specification forming part of Letters Patent No. 120,220, dated October 24, 1871.

*To all whom it may concern:*

Be it known that I, JOHN TORRENT, of Muskegon, in the county of Muskegon and in the State of Michigan, have invented certain Improvements in Log-Rolling Machines; and do hereby declare that the following description, taken in connection with the accompanying drawing hereinafter referred to, forms a full and exact specification of the same, wherein I have set forth the nature and principles of my said improvements, by which my invention may be distinguished from others of a similar class, together with such parts as I claim and desire to secure by Letters Patent.

My invention relates to that class of wood-working machines which is used for turning or rolling logs on the carriages of saw-mills; and the nature thereof consists in certain modifications and improvements in the details of the construction of the same, hereinafter described and shown.

Figure 1:
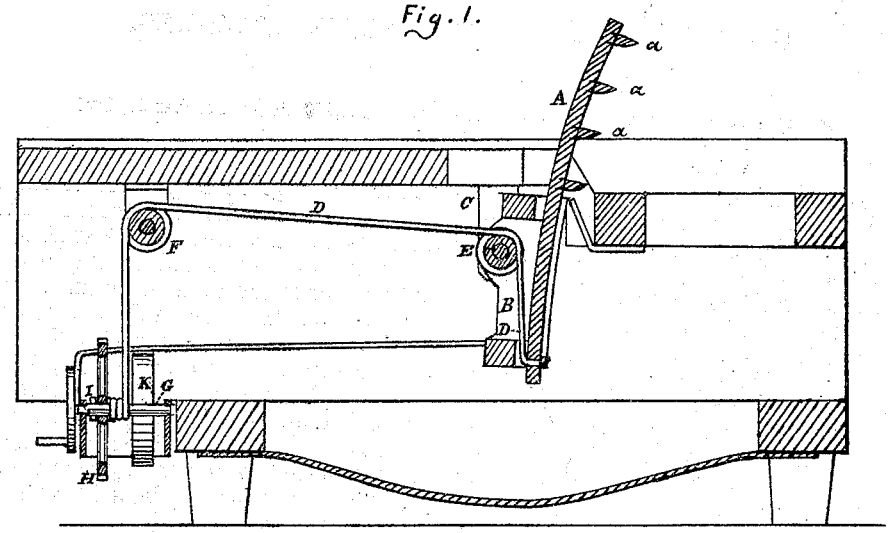
Figure 2:
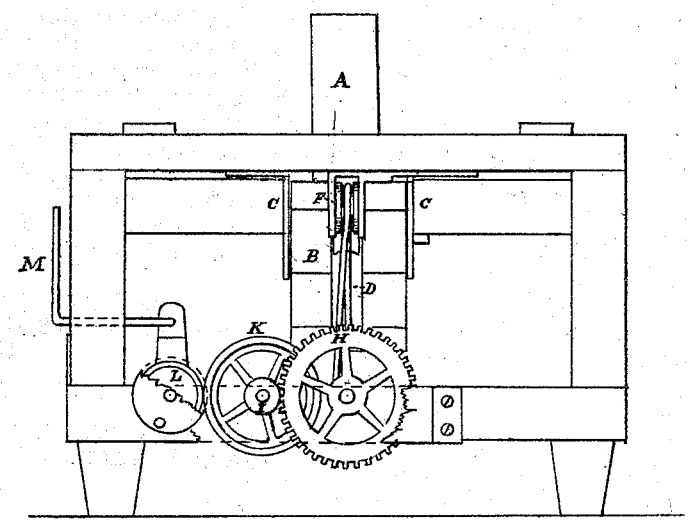

In the accompanying drawing, which illustrates my invention and forms a part of the specification thereof, in which corresponding parts are illustrated by similar letters, Figure 1 is a longitudinal vertical section, and Fig. 2 is a rear view.

The construction and operation of the component parts of my invention are as follows: The toothed bar A is slightly curvilinear in form and provided with the teeth $a$, the upper sides of which are horizontal and the lower sides diagonal, in order that they may "take into" the log when the bar is raised and release themselves with facility when the bar is lowered. The bar A is mounted in the guide B in such a manner that it may be raised or lowered with facility, and the said guide is pivoted to the hangers C in order to allow the said toothed bar to swing freely and adapt itself to the surface of the log to be rolled. Attached to the bottom of the toothed bar is the rope or chain D, which is led upward over the sheave E, pivoted to the said guide, through the fixed pulley F, to the chain-barrel or shaft G. To the said shaft G is rigidly attached the spur-gear H, which engages the pinion I upon the shaft of the larger friction-wheel K. The shaft of the smaller friction-wheel L is alternated to and fro by means of the lever M, by means of which the said wheel is thrown in and out of gear.

When it is desired to roll a log upon the carriage the toothed bar is raised by means of the spur and friction-gears and connecting-chain. When it is required to release the toothed bar the friction-wheels are thrown out of gear by means of the lever, and the bar descends by the force of its own gravity upon the brake, stopping the friction-wheel when down.

Having thus described the construction and operation of my invention, I will indicate in the following clause what I claim as new, and desire to secure by Letters Patent—that is to say:

The combination of the toothed bar A, guide B, and hangers C, when operating together as described.

In testimony that I claim the foregoing I have hereunto set my hand this 31st day of May, 1871.

JOHN TORRENT.

Witnesses:
FRANCIS SMITH,
AARON B. MINER.

(130)